Jan. 3, 1956 W. RINKER 2,728,991
PRECISION MEASURING INSTRUMENT
Filed June 4, 1953 4 Sheets-Sheet 2

INVENTOR:
WILHELM RINKER
BY Richardson, David and Nordon
ATTYS

Jan. 3, 1956 W. RINKER 2,728,991
PRECISION MEASURING INSTRUMENT
Filed June 4, 1953 4 Sheets-Sheet 3
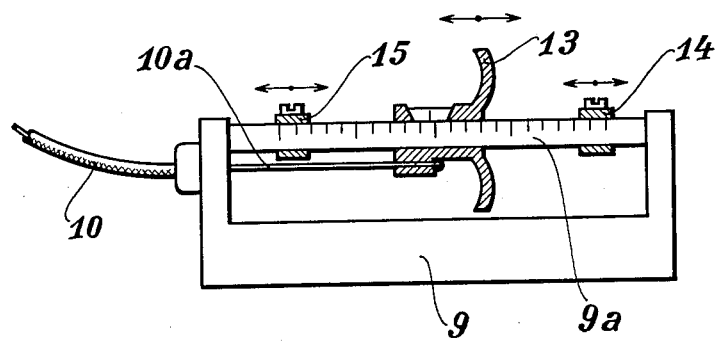
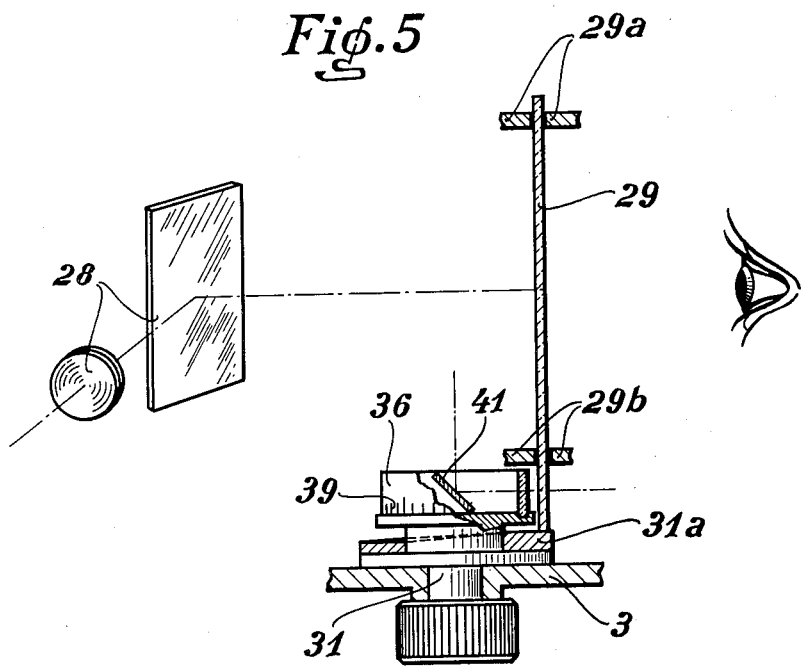
INVENTOR:
WILHELM RINKER
BY
Richardson, David and Nordon
Arry's

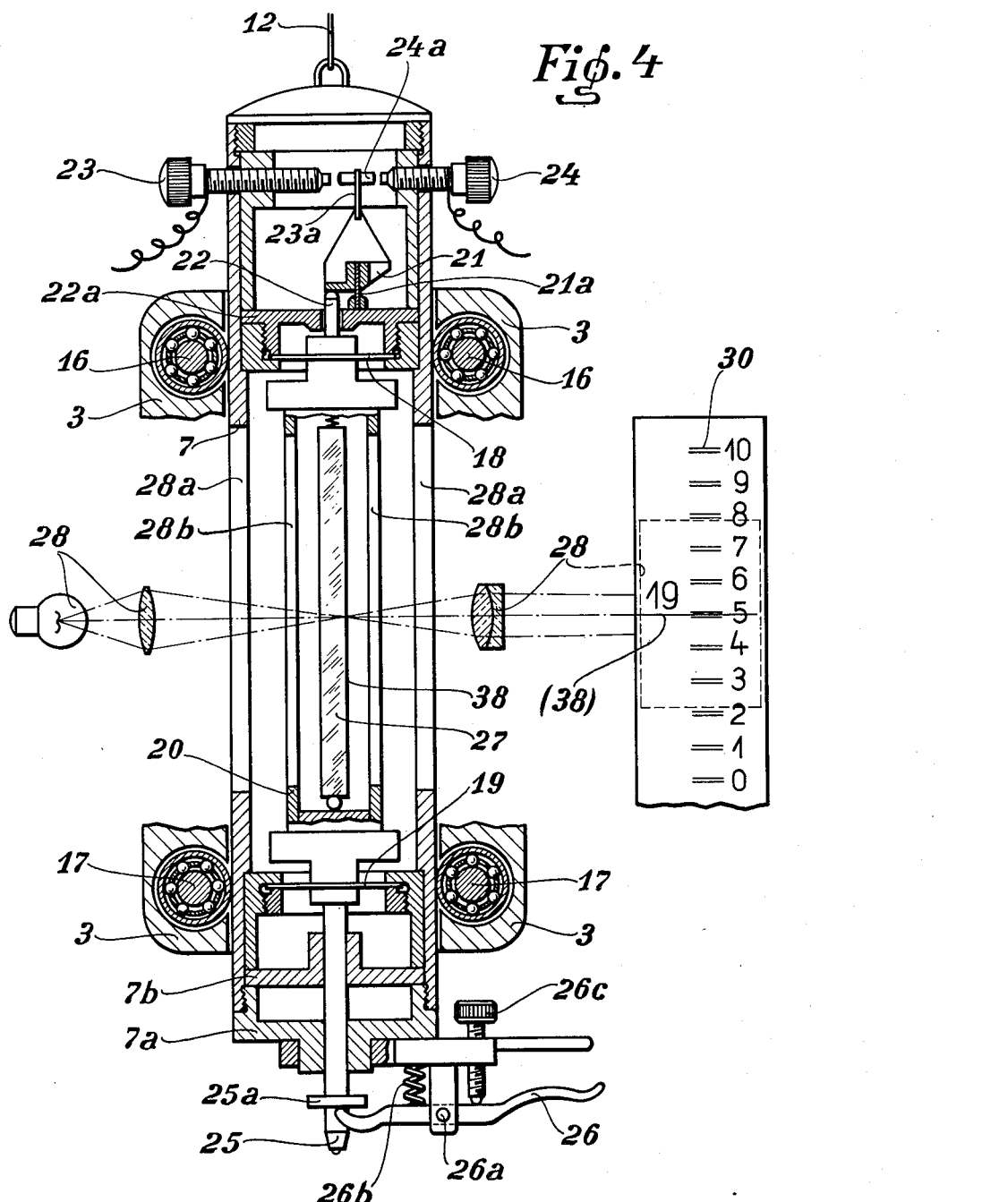

United States Patent Office 2,728,991
Patented Jan. 3, 1956

2,728,991
PRECISION MEASURING INSTRUMENT

Wilhelm Rinker, Wetzlar, Germany, assignor to Ernst Leitz, G. m. b. H., Wetzlar, Germany Application June 4, 1953, Serial No. 359,525

Claims priority, application Germany June 30, 1952

13 Claims. (Cl. 33—147)

The present invention relates to instruments for measuring the dimensions of objects, such as for instance work pieces, tools etc.

The invention relates more particularly to measuring instruments in which the movement of a gauge pin is transmitted to an indicator.

Precision gauges of this general type, which are particularly suitable for mass production measuring purposes, are provided for instance with a gauge pin and lever system which may be combined with electrical means to produce an optical or acoustic signal to indicate permissible tolerances. In order to permit measurements of this sort within any desired range, the gauge pin is carried by a holder which is movably mounted on a supporting frame or housing. In these constructions, the pin is moved manually or mechanically, and adjustment to a particular test value is made by insertion of gauge blocks between the supporting surface of the table and the tip of the gauge pin. This type of adjustment is, however, very cumbersome and time-consuming, because new gauge blocks must be inserted for each new test value desired. When mechanical actuating means are used for the adjustment of the gauge pin holder, micrometer barrels may be provided which, not only permit a zero setting, but also a direct reading of the numerical value of the measurement taken. Some machines of this type comprise a measuring ocular in order to increase the accuracy of the readings. These devices, however, lack tolerance-limit indicating means, and hence are not suitable for high speed measurements required in mass production, because of the relatively long time required for the adjustment and reading.

An object of the invention is to overcome these and other defects of measuring devices known heretofore.

Another object of the invention is to provide a simple device which may be used for highly accurate measurements.

A further object of the invention is to provide a measuring instrument which will permit rapid verification as to whether an article meets the predetermined tolerance limits, without taking any specific readings.

These and other objects will become more apparent from the following specification. Briefly, the present invention comprises a combination of parts which offer substantial advantages with regard to adjustment, accuracy of reading and manipulation. Thus, the tolerance-limit indicating means for instance, can be readily adjusted to the desired value for each measuring position. For this purpose the gauge pin cylinder or holder is movably mounted and provided with a measuring rod. The latter is mounted inside the gauge pin holder and one of its ends forms the gauge pin proper, while its other end engages the tolerance-limit indicating means. Even in the absence of tolerance-limit indicating means, the device can readily be used for plain measuring operations in general.

According to the invention, the device includes a projection apparatus and a ground glass plate or the like. The measuring rod which is provided with the usual scale, is so arranged that the numerical value given by the scale, in accordance with the measurement taken, is projected onto the ground glass. The measuring rod holder is suspended, for instance by means of springs, inside the hollow cylinder supporting the gauge pin and same is movable in the direction of measurement.

In order to avoid deformations caused by the heat attending manual operation, the measuring pin holder is preferably actuated by means of a "Bowden" cable consisting of a wire surrounded by a sheath, a release and brake mechanism forming a separate unit apart from the measuring instrument proper. In view of its structural length and adjustment possibilities, this actuating mechanism is particularly advantageous in those cases where the maximum displacement of the gauge pin is relatively large.

An embodiment of the present invention is fully described in the following specification and illustrated by way of example, in the accompanying drawings, in which—

Figure 3 shows the actuating means or release for the gauge pin holder;

Figure 4 is a sectional view of the gauge pin holder with the tolerance-limit indicating means and reading device;

Figure 5 shows a part of the reading device.

Figure 1:
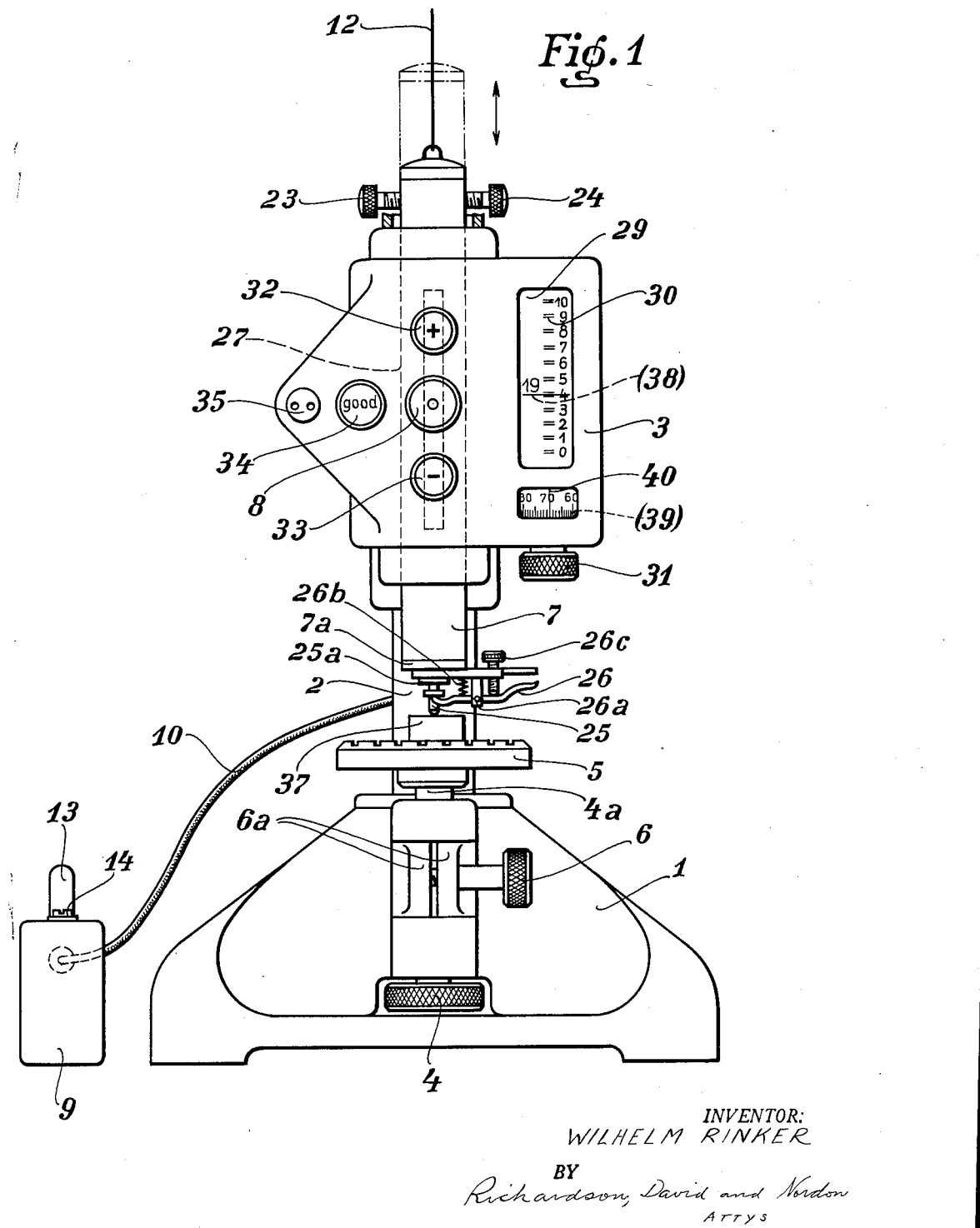
Figure 1 is a front elevation of the new device, the upper part of the housing being omitted.

As shown in the drawings, the base 1 carries upright 2 on which housing 3 is immovably mounted. Base 1 also supports table 5 which is carried by shaft 4a. The latter is provided with a screw thread engaging a threaded portion of base 1 and an actuating knob 4, whereby table 5 may be raised or lowered when knob 4 is turned. Base 1 is also provided with a pair of clamping jaws 6a and a set-screw 6 engaging jaws 6a to lock shaft 4a and with it table 5 in the desired position.

Figure 2:
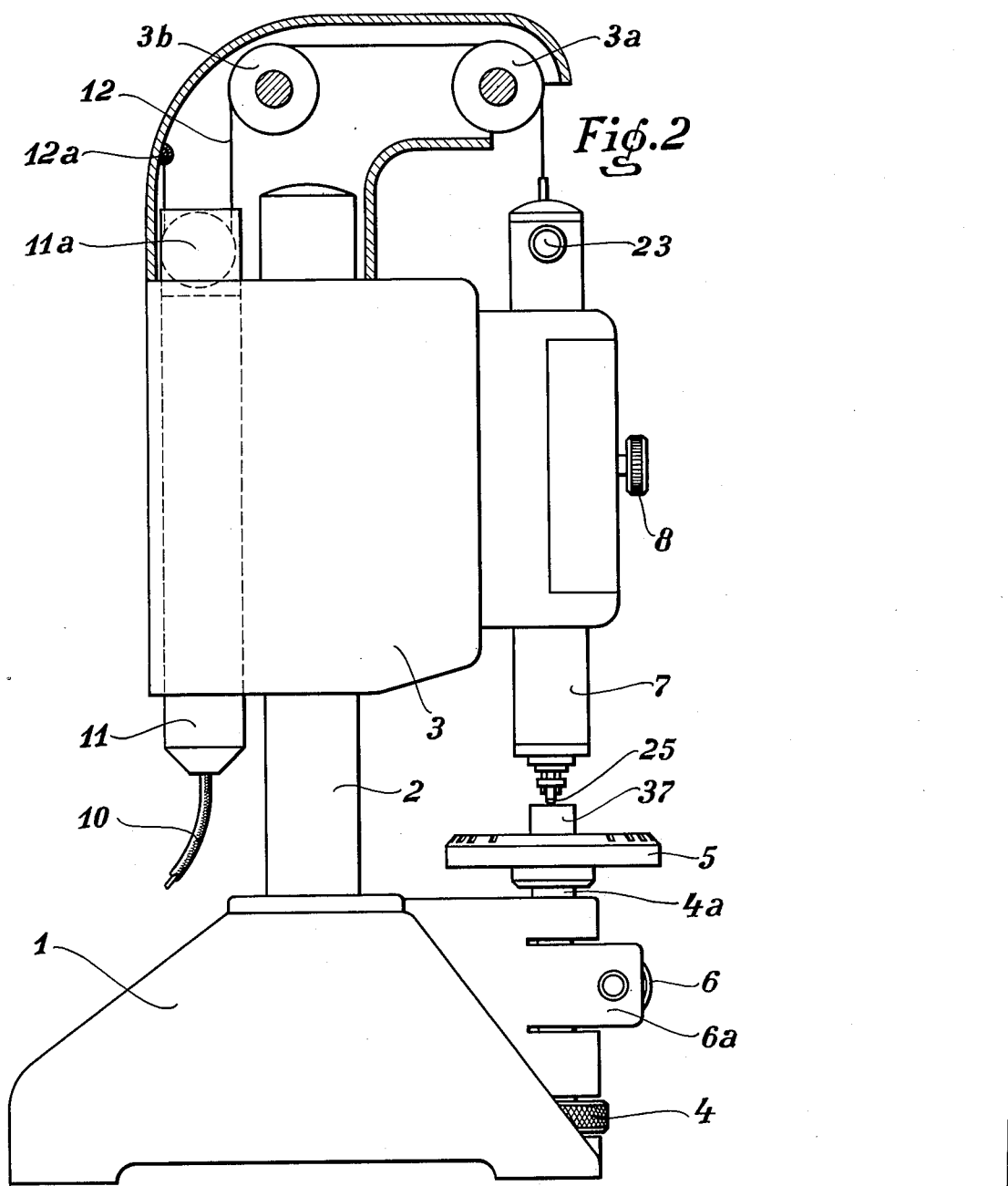
Figure 2 shows the device in side elevation and partly in section.

The measuring unit proper comprises the movable cylindrical element 7 which is suspended from cable 12. The latter is permanently secured to housing 3 at point 12a and runs over sheaves 3a, 3b and 11a, as shown in Fig. 2. Sheaves 3a and 3b are rotatably mounted on housing 3, while sheave 11a is rotatable on brake unit 11.

Housing 3 carries on its inside ball bearings 16, 17 which engage and guide the movable cylinder 7 and permit ready vertical movement thereof. Set-screw 8 serves for locking cylinder 7 to the housing 3 in any desired position. Cylinder 7 can be manually raised and lowered by a separate actuating device 9, shown in Fig. 3, which is connected to brake unit 11 by means of a Bowden cable 10, connected over element 10a to operating handle 13. Actuating device 9 includes graduated rod 9a on which handle 13 is slidably supported. Stops 14 and 15, each of which carries a set-screw, are lengthwise adjustable on rod 9a and serve to limit the actuating movement of handle 13 thereon.

As shown in Fig. 4, a measuring rod 27, consisting of glass or other transparent material, is carried by a support 20 which is secured to two resilient diaphragms or disks 18, 19 mounted inside cylinder 7. The upper end of support 20 which is provided with a guide pin 22 projects through a bore in guide element 22a. Angular lever element 21 is pivotally mounted on guide element 22a, for instance by means of a leaf spring 21a which permits a left or right tilting movement of lever 21. The latter is so weighted and constructed that it has a normal tendency to tilt for instance toward the left (in the position according to Fig. 4). If lever 21 is tilted toward the right, spring 21a tends to restore its left tilt. Lever 21 in its upright position, shown in Fig. 4, rests on guide pin 22. The upper end of lever 21 carries a resilient member 23a on which contact head 24a is mounted. The latter is adapted to make contact with contact screws 23 or 24, depending upon whether it is tilted toward the left or toward the right. In the neutral, upright position of lever 21, shown in Fig. 4, contact is established neither with screw 23 nor with screw 24. The latter are adjustably mounted in cylinder 7 so that they may be turned inwardly or outwardly, and thus moved closer to or farther away from the contact head 24a.

Screws 23, 24 and lever 21 with its contact head 24a and signal lamps 32, 33 and 34 form part of an electrical circuit of conventional type. Signal lamp 32 is actuated when the test piece exceeds the permissible "plus" tolerance, and as a result causes contact between elements 24 and 24a; signal lamp 34 is actuated when the test piece exceeds the permissible "minus" tolerance and as a result closes contact between elements 23 and 24a. Signal lamp 34 is actuated when the dimension tested is within the permissible tolerance limits, or in other words, when no contact is made with screws 23, 24. Lamps 32, 33 and 34, which are mounted on housing 3, are adapted to flash on the signals "+" (plus), "—" (minus) or "good," as indicated in Fig. 1. Reference numeral 35 designates a pair of terminals for connecting the aforementioned circuit to a source of electricity.

Support 20 carries gauge pin 25 at its lower end. The gauge pin projects through a bore in the end piece 7a of cylinder 7, and is further guided by element 7b through which it extends. Element 7b is mounted within cylinder 7 adjacent the lower end thereof.

As shown in Figs. 1 and 2, the test piece or work piece 37 is interposed between the tip of gauge pin 25 and table 5. Collar 25a which is mounted on gauge pin 25 near the free end thereof, is held in engagement with one end of lever 26 by spring 26b. Lever 26 is pivoted to cylinder 7 at 26a and the movement of lever 26 is limited by screw 26c which is adjustably mounted on cylinder 7.

Measuring rod 27 carries a vertically arranged principal scale 38 whose indicia are projected onto the ground glass 29 by means of a conventional projection device 28. By way of example, principal scale indicia "19" with its horizontal indicating line is shown on the ground glass 29 in projected form, in Fig. 1. Ground glass 29 and projector 28 are mounted in housing 3. Cylinder 7 and support 20, which carries the transparent measuring rod 27, are both provided with suitable windows or cut-outs 28a, 28b to permit unobstructed passage of the projection rays from the lamp of the projector to the ground glass 29. The latter, which is provided with a subdivision scale 30, rests on ring 31a whose descreasing thickness forms a cam surface. Ring 31a is rigidly connected to and rotatable with knob 31 to raise and lower ground glass 29. Elements 29a and 29b serve as guides for ground glass 29. An auxiliary scale 39 is carried by a transparent drum 36 which is likewise rigidly connected to knob 31 and rotatable therewith. The portion of ground glass 29 extending between elements 29b and 31a serves for the reading of auxiliary scale 39 and for that purpose this portion of the ground glass 29 is provided with a vertical reference line 40. The indicia appearing on scale 39 are projected onto this portion of the ground glass 29 in known manner by means of mirror 41 and a source of light, not shown. The extent of the circular movement of ring 31a, and hence the extent of the vertical displacement of ground glass 29 as a result of the cam action mentioned, can thus readily be determined with the aid of scale 39 and reference line 40.

The operation of the device is as follows:

First, the tip of gauge pin 25 is placed in contact with the top surface of table 5 and the latter, with the gauge pin 25 resting on it, is then adjusted by means of screw 4, until zero mark of the principal scale 38 coincides with the zero mark of subdivision scale 30. Subdivision scale 30 is divided into ten intervals whose sum total equals the distance between two adjacent divisions of the principal scale. Auxiliary scale 39 is likewise adjusted to zero, as a preliminary step. It will be observed that any measurement taken now will indicate the true distance between the top surface of table 5 and the tip of gauge pin 25. When it is desired to measure a work piece 37, cylinder 7 is raised by operation of the actuating means 9 and, after the work piece 37 has been placed in position, same is lowered again. Inasmuch as cylinder 7 is connected by cable 12 with the adjustable brake 11, it performs a relatively slow return movement. In order to limit the raising and lowering operation to a minimum, which is particularly advantageous in series measurements of work pieces in mass production, the stops 14, 15 of actuating means 9 are suitably adjusted. As soon as the gauge pin 25 engages the work piece 37, the principal and divisional values of the dimension measured can be read directly from the ground glass 29. A more accurate reading can be obtained by turning the knurled knob 31 so as to adjust the vertical position of ground glass 29. In this connection the subdivision line of scale 30 that lies next below the projected subdivision line of the principal scale 38 is raised up to the latter. The extent of this movement is measured by auxiliary scale 39 whose indicia are projected onto the lower part of ground glass 29 where the measurement can be directly read off, the true value being represented by the indicia in coincidence with the vertical reference line 40 on ground glass 29. In the example shown in Fig. 1, the measurement value indicated by the scales 30, 38 and 39 is: 19.469.

In order to set the device for given tolerance values, the cylinder 7 is first roughly adjusted to the desired dimension by means of the actuating device 9 and is then locked in position by means of screw 8. Lever 26 is now used for more accurate adjustment of the upper and lower tolerance limits. The play of the resilient diaphragms 18, 19 is sufficiently large in this connection so that, aside from average tolerance limits, a further displacement of the gauge pin 25 from a rough setting to a finer setting can still be effected. The screws 23 and 24 are adjusted to the desired extent and in their respective tolerance positions contact the angle lever 21. When contact is established, lamp 32 or 33 will light up. If there is no contact between the lever 21 and the contacts 23, 24 the "good" lamp 34 will light up. Lever 26 also serves for lifting the gauge pin 25 for the purpose of inserting a work piece 37. In that case, screw 26c which limits the movement of lever 26, must be turned all the way up in order to afford a sufficient range of movement for gauge pin 25. In order to be able to tilt the angle lever 21 beyond the tolerance range, as limited by screws 23, 24, contact head 24a may be supported by a spring or other resilient means. The measuring rod 27 may likewise be resiliently mounted on support 20, as shown in Fig. 4, in order to absorb shocks occasioned during the operation of the device. Shocks to the movable elements of the device are held to a minimum by means of element 11 which is preferably a hydraulic oil brake.

I claim:

1. A device for determination of tolerance conformity and absolute linear dimension of a workpiece, comprising a support for said workpiece, a housing, a tubular element provided with a cut-out and movably disposed within said housing, pin means for contacting said workpiece projecting from said element toward said support, actuatable regulating means on said element cooperating with said pin means for maintaining said pin means in predetermined position relative to said element and for moving said pin means into said element, scale means within said element and operatively connected to said pin means for movement therewith, signal means including a plurality of contact means selectively actuated by movement of said scale means, screen means on said housing, and means within said housing aligned with said cut-out of said element for projecting an image of said scale means onto said screen means, whereby said scale means determines the absolute linear dimension of said workpiece while said signal means determines conformity of the workpiece with a preselected tolerance range.

2. A device according to claim 1, including adjusting means for moving said support vertically.

3. A device according to claim 1, said actuatable regulating means including a fixed arm extending from said element, and a spring-biased lever arm operatively connected to said fixed arm and cooperating with said pin means, whereby actuation of said lever arm against said spring effects movement of said pin means into said element.

4. A device according to claim 3, including adjustable screw means cooperating with said fixed arm and said lever arm for limiting their relative displacement.

5. A device for determination of tolerance conformity and absolute linear dimension of a workpiece, comprising a support for said workpiece, a housing connected to said support, a vertically disposed cylindrical element supported for vertical movement through said housing, said cylindrical element being provided with a pair of substantially diametrically opposed cut-outs, a supporting sleeve having upper and lower ends disposed within said cylindrical element and provided with a pair of apertures aligned with said cut-outs of said cylindrical element, feeler pin means connected to said lower end of said sleeve and extending through said cylindrical element, flange means on said feeler pin means, regulating means on said cylindrical element cooperating with said flange means for maintaining said feeler pin means in predetermined position relative to said cylindrical element and for moving said feeler pin means upwardly, until said flange means abuts said cylindrical element, guide pin means connected to said upper end of said sleeve means, spring-biased first contact means engaging said guide pin means, a pair of second contact means selectively actuated upon movement of said first contact means together with said sleeve and said feeler pin means thereby determining conformity of the workpiece with a preselected tolerance range, transparent scale means mounted within said sleeve, screen means on said housing, and means within said housing aligned with said cut-outs and said apertures for projecting light and an image of said scale means onto said screen means, whereby the absolute linear dimension of said workpiece can be determined.

6. A device according to claim 5, including means for locking said cylindrical element to said housing for presetting the same, whereby control of individual measurements is effected by said regulating means without movement of said cylindrical means.

7. A device according to claim 6, including resilient means supporting said sleeve means within said cylindrical element.

8. A device according to claim 7, including spring means supporting said scale means within said sleeve.

9. The device according to claim 5, including a manually operable adjusting cam and an auxiliary scale connected thereto, said cam being operatively connected to said screen to raise and lower the same, the extent of the screen adjustment by means of said cam being indicated by said auxiliary scale.

10. The device claimed in claim 9, wherein said projection means are operatively disposed with respect to said auxiliary scale and said screen, the latter being provided with a reference mark in the area of projection of the auxiliary scale, whereby displacement of the auxiliary scale, as the result of cam movement, is projected onto the screen where it can be read with the aid of said reference mark.

11. The device according to claim 5, including suspension means for said cylindrical element, brake means connected to said suspension means for checking the movement of said cylindrical element, said suspension and brake means being mounted on said support, and an actuating device connected to said brake and suspensions means for moving said cylindrical element together with said sleeve.

12. The device claimed in claim 11, in which said brake means includes an adjustable hydraulic oil brake mechanism.

13. The device according to claim 11, said actuating device comprising a bar, an operating handle slidably supported on said bar for manipulation of the actuating device, a pair of stops movably connected to said bar, and locking means associated with said stops for locking the same to said bar at selected points, said stops serving to limit the movement of said operating handle, whereby the movement of said cylindrical element is correspondingly limited.

References Cited in the file of this patent

UNITED STATES PATENTS

| | | |
|---|---|---|
| 2,244,964 | Poock et al. | June 10, 1941 |
| 2,350,862 | Ayers | June 6, 1944 |
| 2,355,910 | Gallasch | Aug. 15, 1944 |
| 2,356,274 | Roger | Aug. 22, 1944 |
| 2,403,896 | Aller | July 16, 1946 |

FOREIGN PATENTS

| | | |
|---|---|---|
| 567,982 | Great Britain | Mar. 13, 1945 |